(12) United States Patent
Goldenberg et al.

(10) Patent No.: US 12,005,830 B1
(45) Date of Patent: Jun. 11, 2024

(54) TOY HAULER RECREATIONAL VEHICLE

(71) Applicant: Grand Design RV, LLC, Middlebury, IN (US)

(72) Inventors: Nathan Goldenberg, Granger, IN (US); Ryan B. Getz, Goshen, IN (US); Thomas R. Cramer, Elkhart, IN (US)

(73) Assignee: Grand Design RV, LLC, Middlebury, IN (US)

( * ) Notice: Subject to any disclaimer, the term of this patent is extended or adjusted under 35 U.S.C. 154(b) by 105 days.

(21) Appl. No.: 17/961,924

(22) Filed: Oct. 7, 2022

Related U.S. Application Data

(63) Continuation of application No. 15/930,731, filed on May 13, 2020, now Pat. No. 11,465,547, which is a continuation of application No. 16/058,518, filed on Aug. 8, 2018, now Pat. No. 10,654,398, which is a continuation of application No. 15/267,562, filed on Sep. 16, 2016, now Pat. No. 10,046,690.

(51) Int. Cl.
*B60P 3/34* (2006.01)
*B60P 3/39* (2006.01)

(52) U.S. Cl.
CPC .. *B60P 3/39* (2013.01); *B60P 3/34* (2013.01)

(58) Field of Classification Search
None
See application file for complete search history.

(56) References Cited

U.S. PATENT DOCUMENTS

| 7,618,085 B1 * | 11/2009 | Bean | B60P 3/32 296/157 |
| 2003/0099532 A1 * | 5/2003 | Williams | B60P 3/36 414/559 |

FOREIGN PATENT DOCUMENTS

| DE | 19928646 A1 * | 12/2000 | B60P 3/07 |
| EP | 1405760 A1 * | 4/2004 | B60P 1/43 |

* cited by examiner

*Primary Examiner* — Joseph D. Pape
(74) *Attorney, Agent, or Firm* — Faegre Drinker Biddle & Reath LLP

(57) ABSTRACT

A toy hauler recreational vehicle includes a first area having a first floor located at a first level, a second area having a second floor located at a second level that is lower than the first level, and a third area having a third floor located at a third level that is higher than the second level. The second area is positioned between the first area and the third area. The recreational vehicle also includes a garage area with a garage floor located at a fourth level that is lower than the third level. The garage area includes a ceiling that is movable between a lower height and an upper height. The recreational vehicle also includes a bed positioned above the ceiling and that is movable between a lowered position and a raised position.

20 Claims, 12 Drawing Sheets

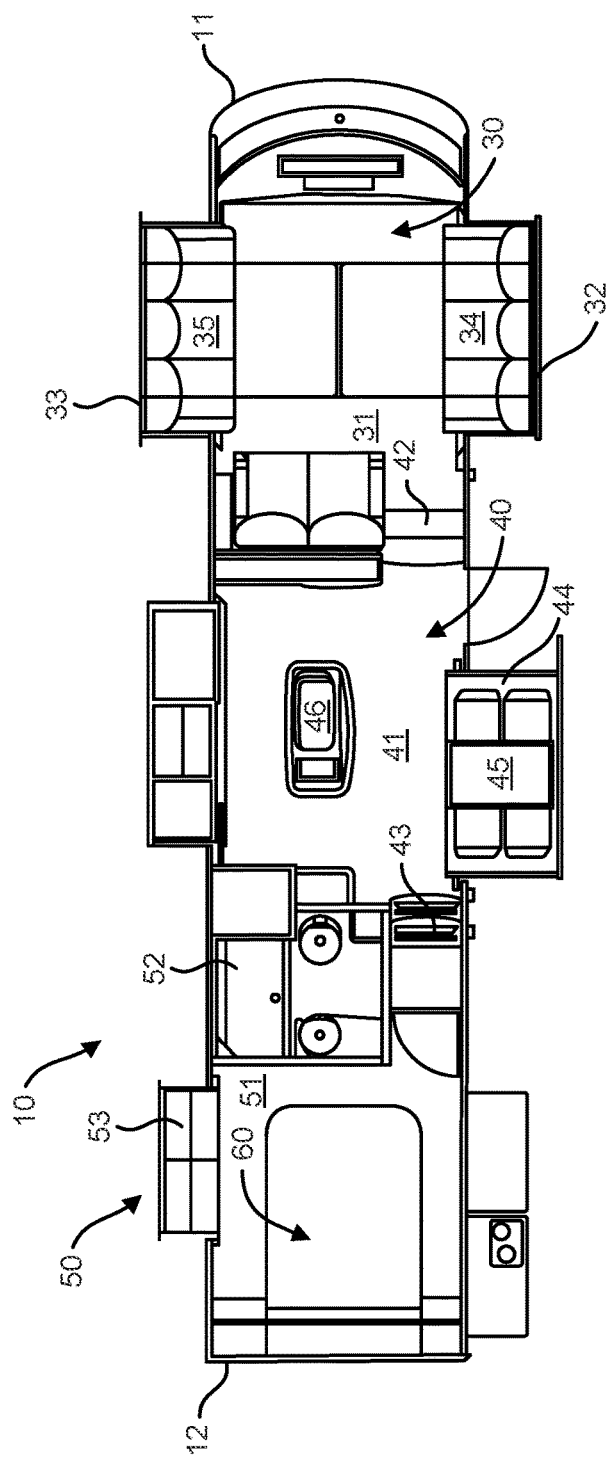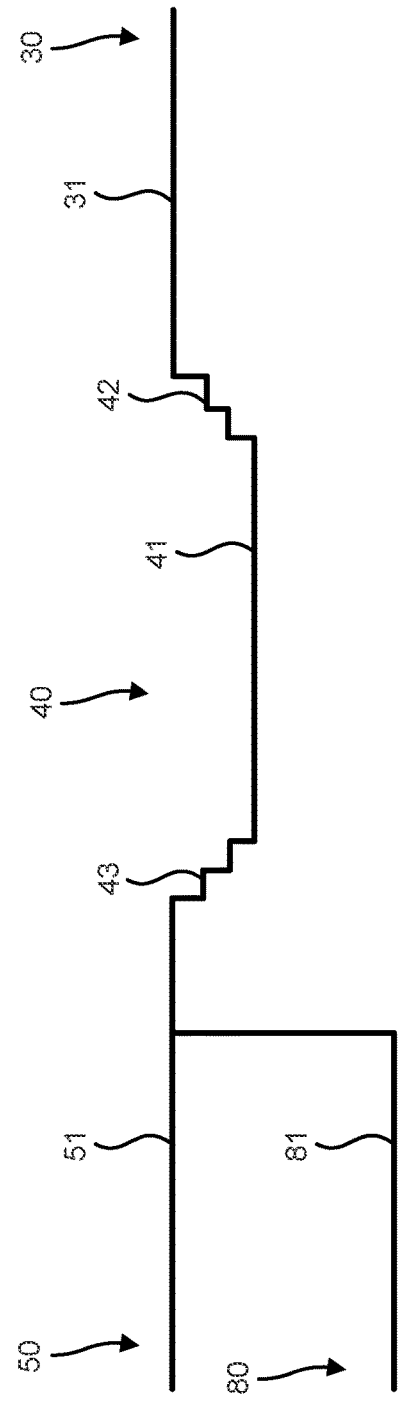
FIG. 1
FIG. 1A

TOY HAULER RECREATIONAL VEHICLE

CROSS-REFERENCE TO RELATED APPLICATIONS

This application is a Continuation of U.S. patent application Ser. No. 15/930,731, filed May 13, 2020, which is a Continuation of U.S. patent application Ser. No. 16/058,518, filed Aug. 8, 2018, now issued as U.S. Pat. No. 10,654,398, which is a Continuation of U.S. patent application Ser. No. 15/267,562, filed Sep. 16, 2016, now issued as U.S. Pat. No. 10,046,690, all of which are herein incorporated by reference.

TECHNICAL FIELD

The present invention relates to recreational vehicles and, more particularly, to a toy hauler recreational vehicle.

SUMMARY

In one embodiment of the present invention, a recreational vehicle includes a first living area having a floor, a second living area having a floor located at a level below the floor of the first living area, a third living area having a floor located at a level above the level of the floor of the second living area and a bed located in the third living area. The bed includes a platform supported above the floor of the third living area by a support structure. The support structure includes a first side, a second side and an end. The platform has an upper surface and a lower surface and is movable from a first position in which the lower surface of the platform is located adjacent the support structure to a second position in which the lower surface of the platform is spaced above and apart from the support structure. The recreational vehicle further includes a garage located below the third living area. The garage includes a floor, a first side wall, a front end, a second side wall and a ceiling defined at least in part by the lower surface of the bed platform.

In one embodiment of the invention, the garage includes a second ceiling located closer to the floor of the garage than the ceiling. In another embodiment of the invention, the ceiling is the lower surface of the bed platform.

A recreational vehicle according to another embodiment of the present invention includes a first living area having a floor, a second living area having a floor located at a level below the floor of the first living area, a third living area having a floor located at a level above the level of the floor of the second living area, a garage located below the third living area and a chassis. The chassis has a first section located beneath the first living area, a second section located beneath the second living area, a third section located beneath the third living area and the garage and a pair of longitudinally extending side rails extending the length of the third section and extending a portion of the length of the second section. Each of the side rails has an upper surface. The chassis further includes at least one truss located in the second section. The truss has a first end connected to one of the side rails, a second end connected to the other side rail and an upper surface located at substantially the same height as the upper surface of each of the side rails. The chassis also includes at least one beam located in the third section. The beam has a first end connected to one of the side rails, a second end connected to the other side rail and an upper surface located at a level lower than the upper surface of the truss. The third section includes an unobstructed area above the beam and between the side rails. In one embodiment, the beam supports the floor of the garage.

In another embodiment, the chassis further includes at least one reinforcing member connected to at least one of the side rails in the third section. In one embodiment, the reinforcing member is a vertically extending I-beam. In another embodiment, the chassis includes a second reinforcing member connected to at least one of the frame rails in the third section and a third reinforcing member connecting the first and second reinforcing members.

BRIEF DESCRIPTION OF THE DRAWINGS

FIG. 1 is a plan view of the interior of a recreational vehicle according to one embodiment of the present invention, and FIG. 1A is a schematic elevation view of portions of the floors of the recreational vehicle of FIG. 1, as described herein.

DETAILED DESCRIPTION

Figure 2:
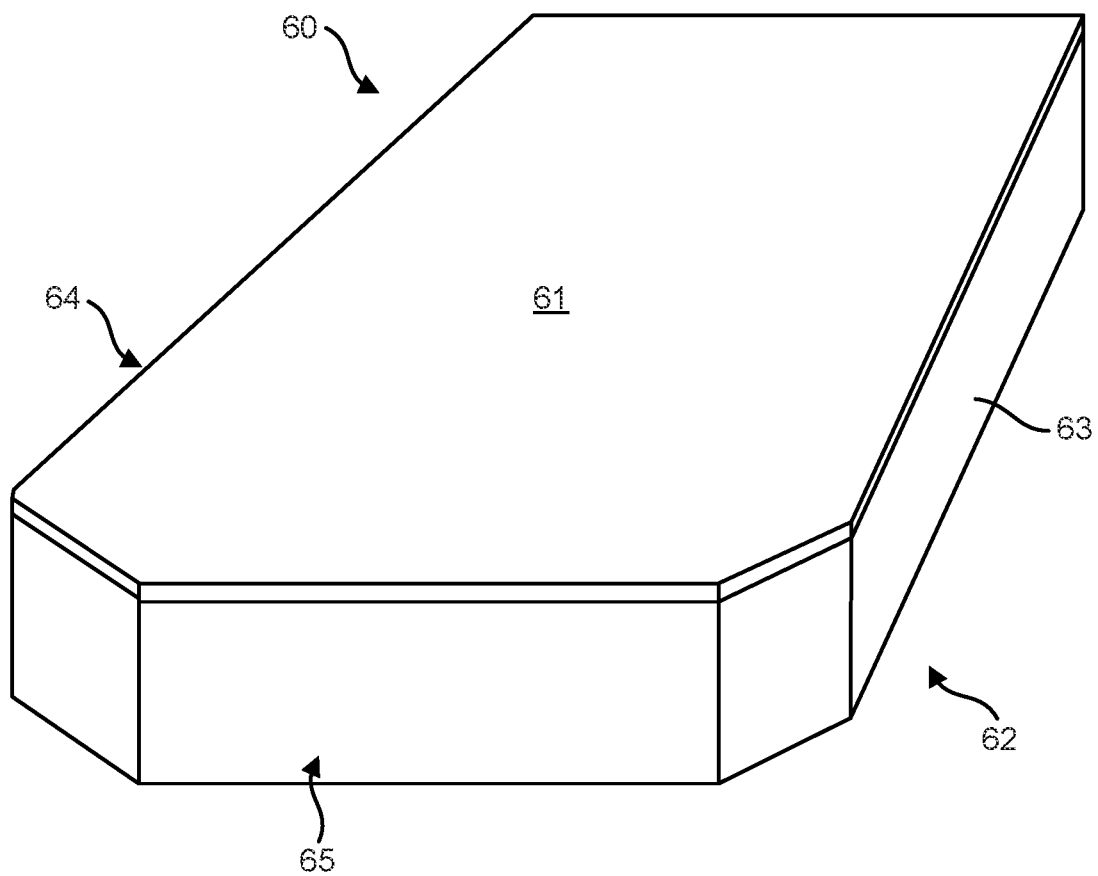
FIG. 2 is a perspective view of a first embodiment of a bed that is a component of the recreational vehicle shown in FIG. 1.

Referring to FIG. 1, recreational vehicle 10 includes a front or hitch end 11 and a rear or garage/bedroom end 12. In the embodiment shown, the interior of recreational vehicle 10 includes a first living area 30 having a floor 31, a second living area 40 having a floor 41, and a third living area 50 having a floor 51. Floor 31 is elevated above floor 41. Steps 42 provide access between first living area 30 and second living area 40. Similarly, floor 51 is elevated above floor 41. Steps 43 provide access between second living area 40 and third living area 50. As shown in FIG. 1, the third living area 50 includes a restroom 52. FIG. 1 further shows that first living area 30 includes opposing first and second slideouts 32 and 33. The first and second slideouts 32 and 33 are each shown with furniture 34 and 35. FIG. 1 also shows the second living area 40 includes a third slideout 44, which is shown with furniture 45, and an island 46. FIG. 1 shows the third area 50 including a fourth slideout 53.

As shown in FIGS. 1 and 2, third living area 50 includes a bed 60. Bed 60 generally includes a raised platform 61 supported above floor 51 by a support structure 62. Platform 61 may be used to support a mattress or other sleeping surface. Support structure 62 generally includes a first side 63, a second side 64 and a first end 65.

Figure 3:
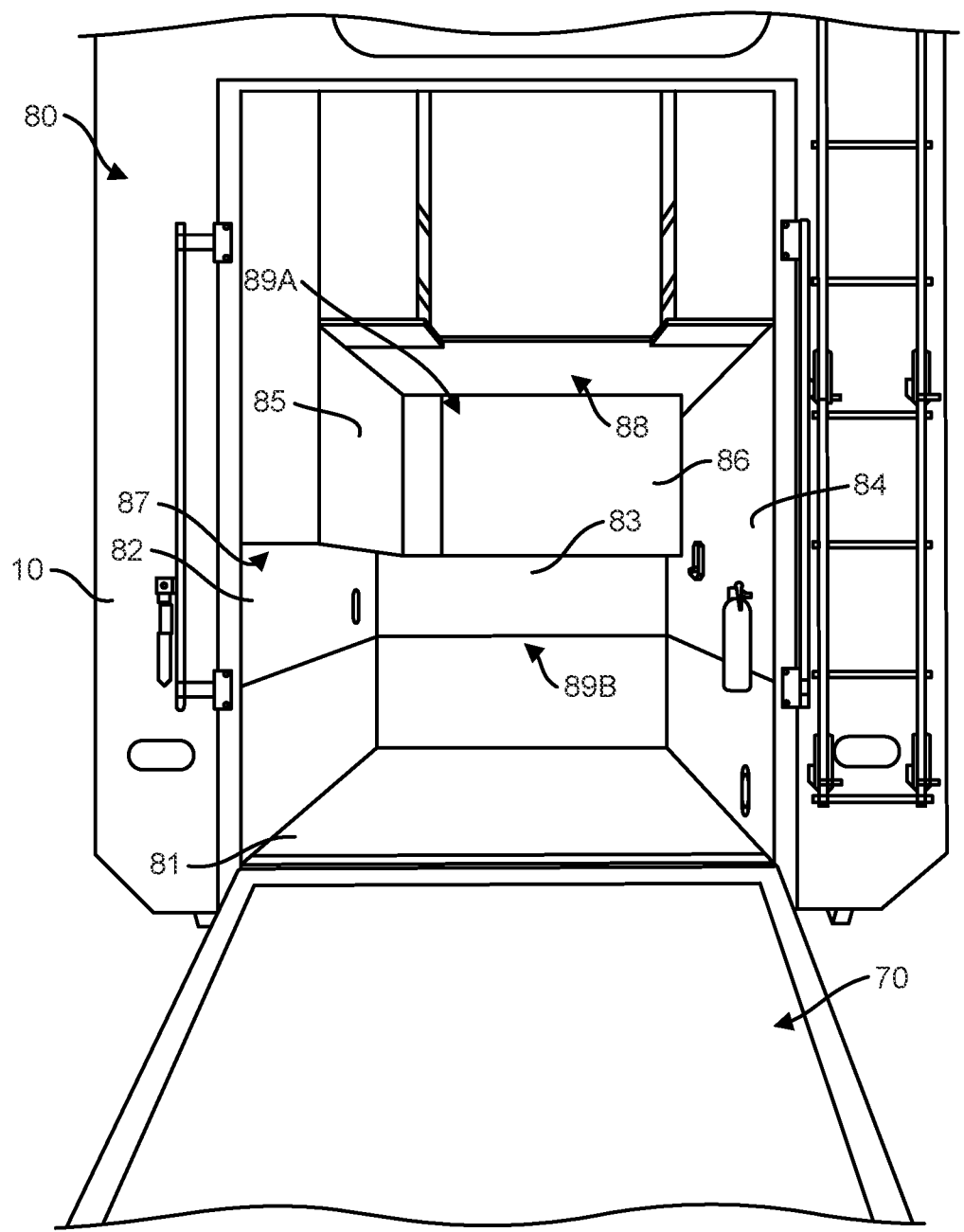
FIG. 3 is a rear elevational view of the recreational vehicle shown in FIG. 1 with the garage ramp door in the open position.

Second end 12 of recreational vehicle 10 further includes a fold-down ramp door 70 that provides access to a garage 80 located beneath third living area 50. As shown in FIG. 3, Garage 80 generally includes a floor 81, a first side wall 82, a front wall 83, a second side wall 84, an inner side wall 85, an inner front wall 86, a first or lower ceiling 87 and a second or upper ceiling 88. Lower ceiling 87 extends adjacent first side wall 82 and front wall 83 below inner side wall 85 and inner front wall 86. Upper ceiling 88 of garage 80 is positioned directly below platform 61 of bed 60 such that space 89A in garage 80 corresponds to the space below platform 61 and bounded by first side 63, second side 64 and first end 65 of support structure 62 of bed 60. Garage 80 further includes a second space 89B extending from first side wall 82 to second side wall 84 below lower ceiling 86.

Figure 4:
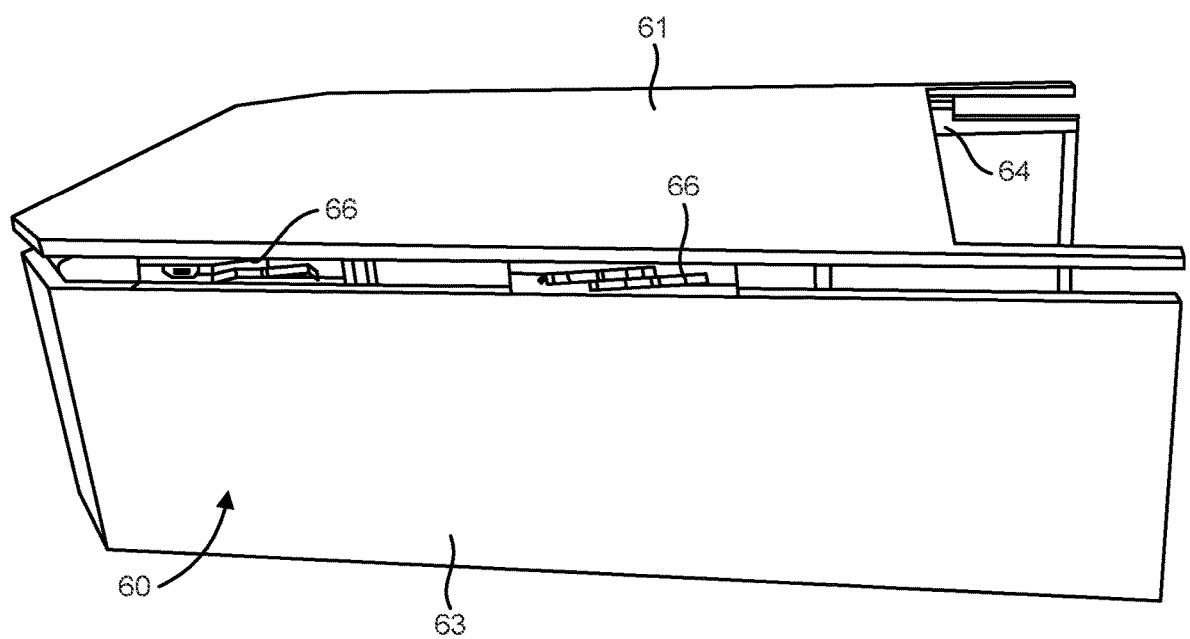
FIG. 4 is a perspective view of a second embodiment of the bed shown in FIG. 2 with the platform in the lowered position.
Figure 5:
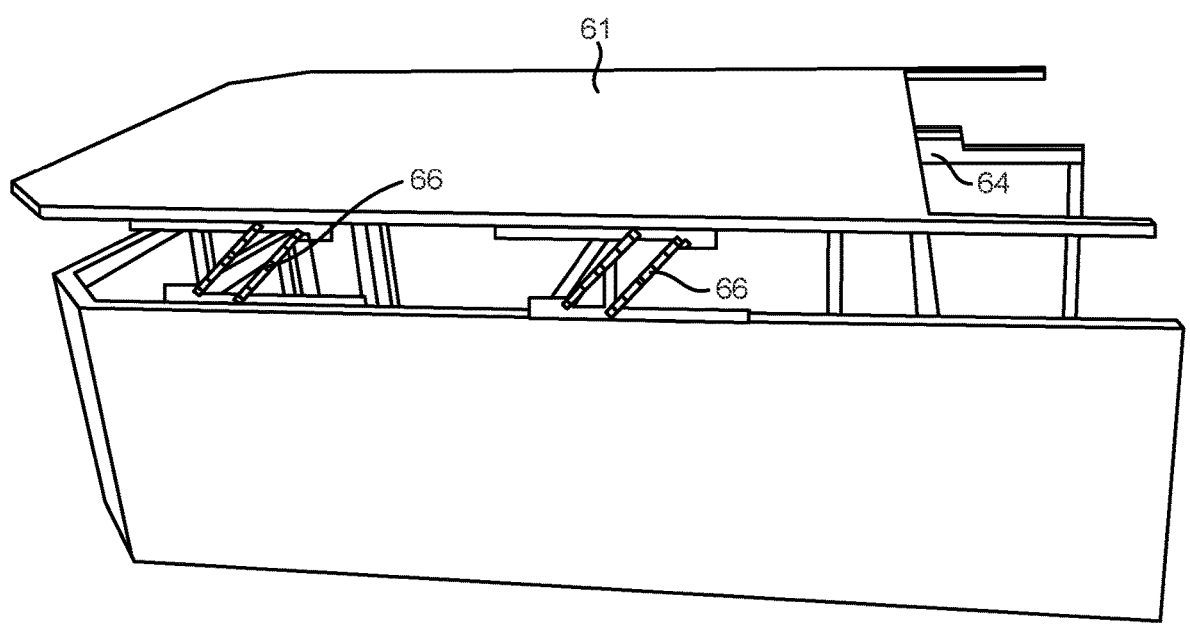
FIG. 5 is a perspective view of a second embodiment of the bed shown in FIG. 2 with the platform in an intermediate position.
Figure 6:
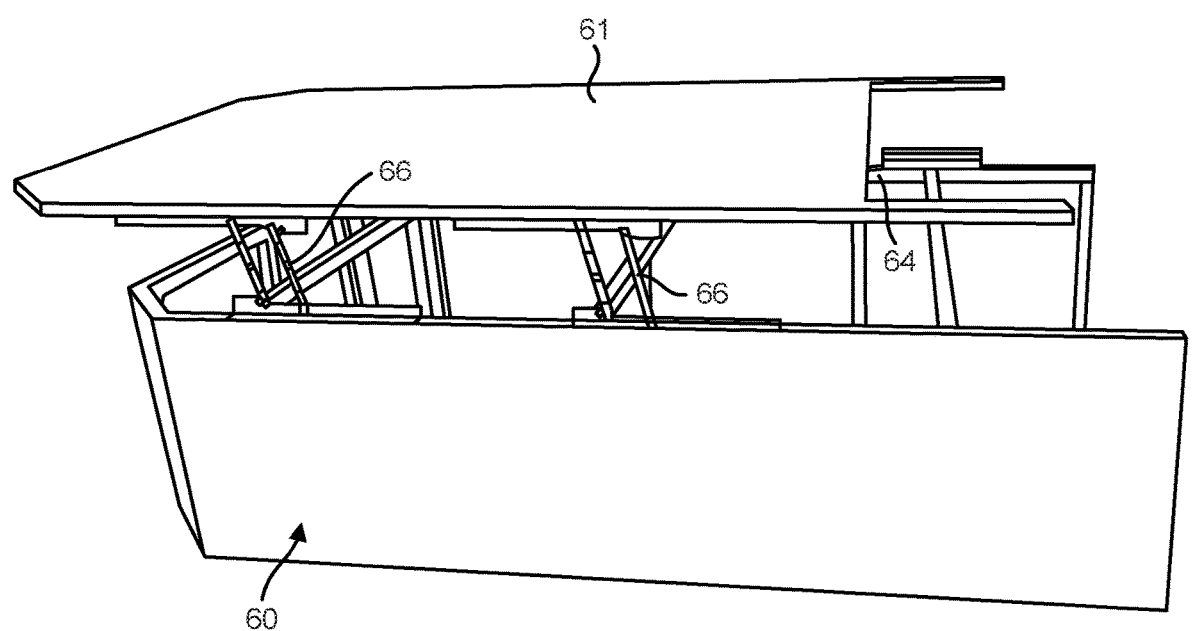
FIG. 6 is a perspective view of a second embodiment of the bed shown in FIG. 2 with the platform in the fully raised position.
Figure 7:
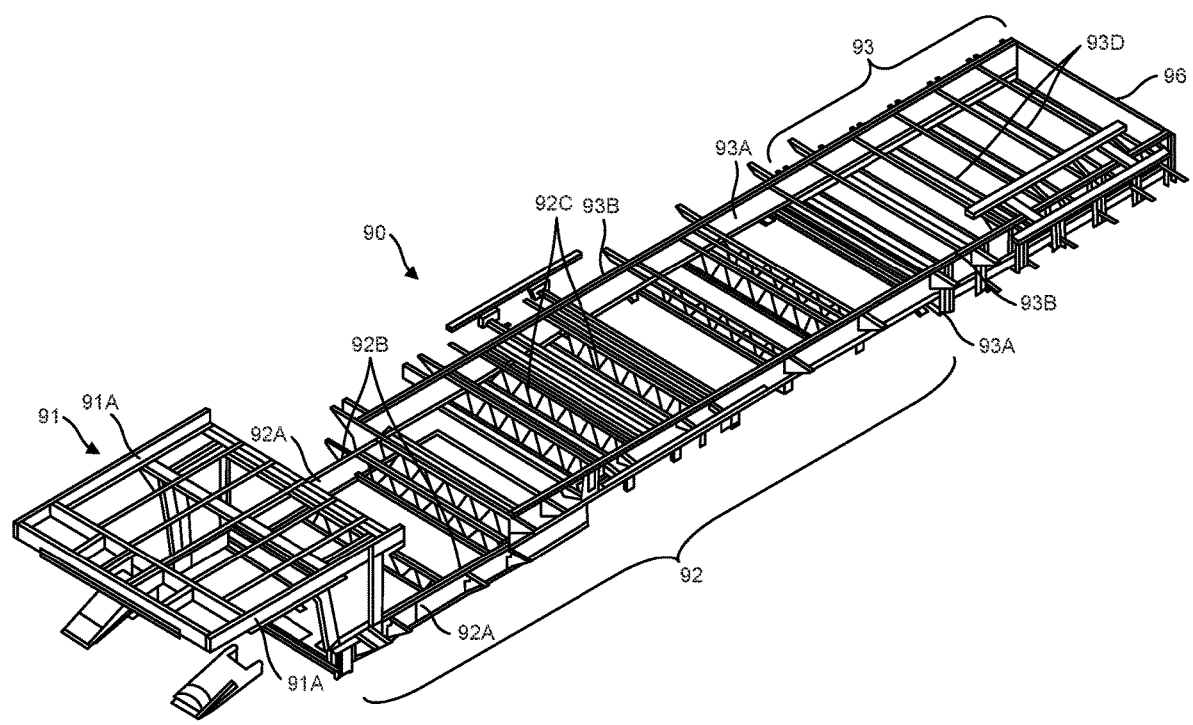
FIG. 7 is a perspective view of a chassis that is a component of the recreational vehicle shown in FIG. 1.
Figure 8:
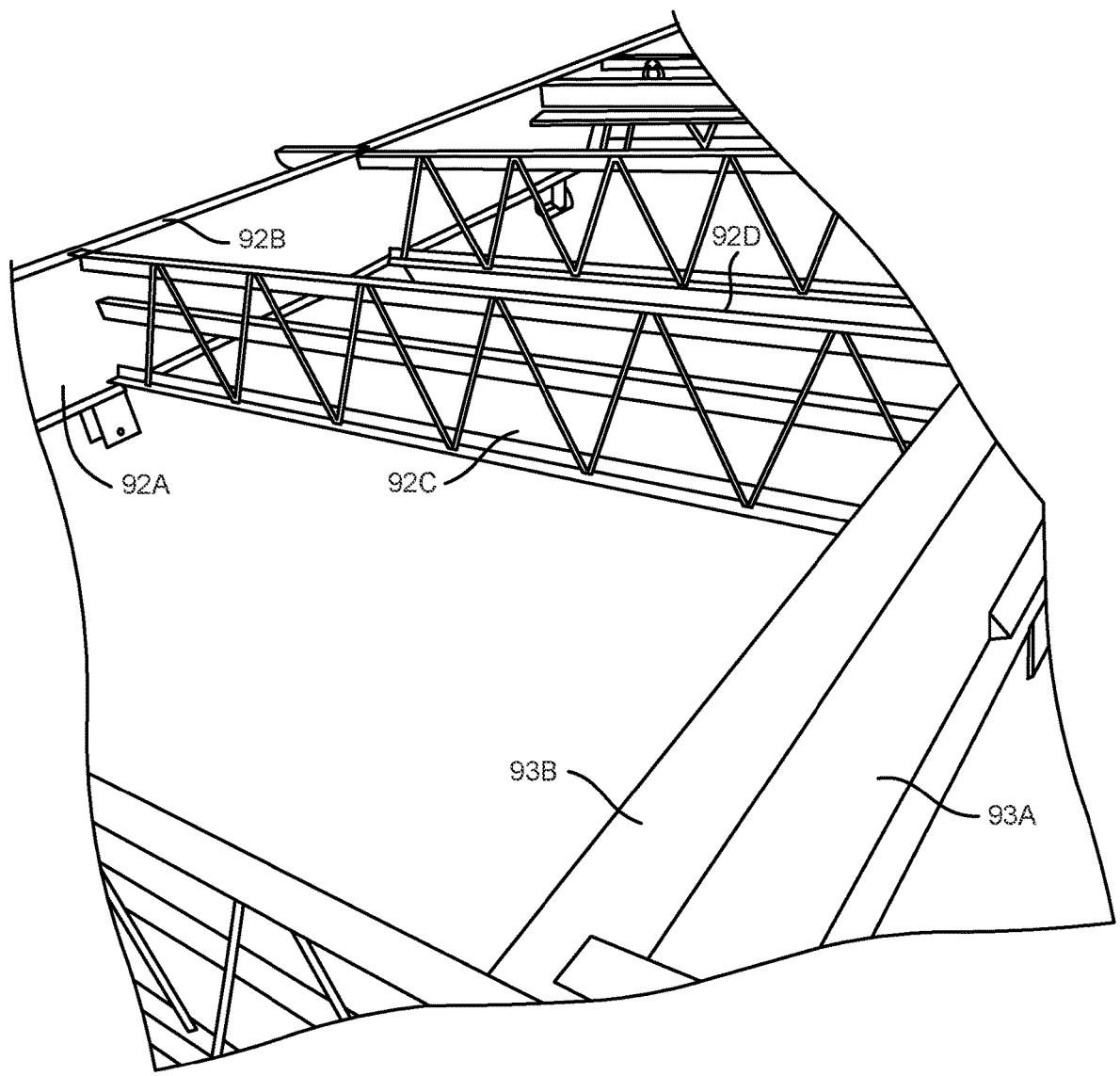
FIG. 8 is a perspective view of a section of the chassis shown in FIG. 7.
Figure 9:
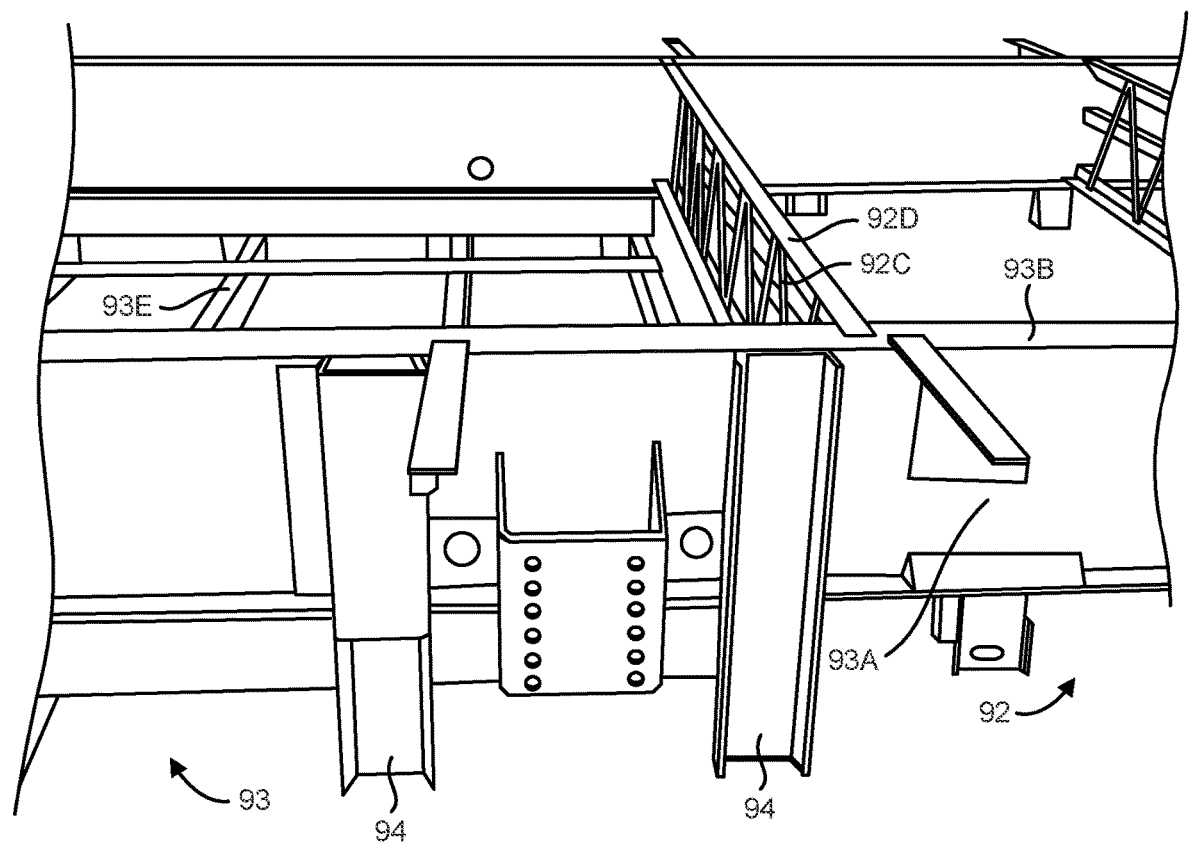
FIG. 9 is a side view of a section of the chassis shown in FIG. 7.
Figure 10:
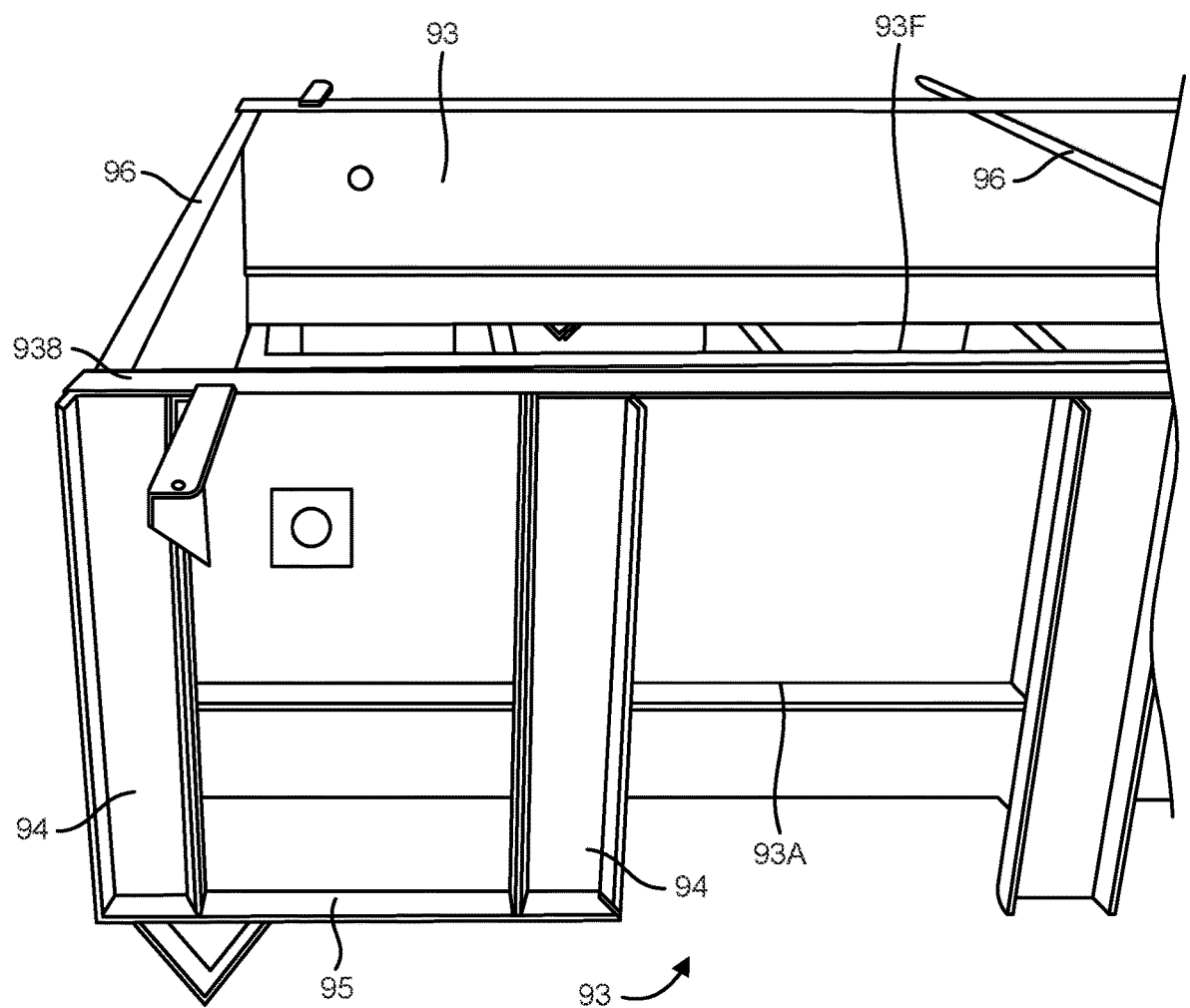
FIG. 10 is a side view of a section of the chassis shown in FIG. 7.

FIGS. 4-6 show an alternative embodiment of bed 60. In this embodiment, platform 61 is connected to first side 63 and second side 64 of support structure 62 by pivoting swing arms 66. This permits platform 61 to be selectively raised from its lowered position shown in FIG. 4 to its raised position shown in FIG. 6. To raise platform 61, the user simply lifts it and pulls or pushes it in the direction of first end 65 of support structure 62. Platform 61 is lowered by pulling or pushing it downward and away from first end 65 of support structure 62. In this manner, the height of upper ceiling 88 of garage 80 may be increased to provide greater clearance.

Referring to FIGS. 7-10, recreational vehicle 10 includes a chassis 90 having a first section 91 located beneath first living area 30, a second section 92 located beneath second living area 40 and a third section 93 located beneath third living area 50 and garage 80. First section 91 includes a first pair of two longitudinally extending side rails 91A. Second section 92 includes a second pair of longitudinally extending side rails 92A, each having an upper surface 92B. Second section 92 and third section 93 include a shared third pair of longitudinally extending side rails 93A, each having an upper surface 93B. Side rails 93A are connected to the upper surface 92B of side rails 92A.

Second section 92 further includes trusses 92C connected at opposite ends to side rails 93A. Trusses 92C have upper surfaces 92D located at substantially the same height as upper surfaces 93B of side rails 93A. Trusses 92C provide structural support and rigidity to second section 92 of chassis 90. Third section 93 of chassis 90 does not include trusses. Rather, third section 93 includes a plurality of beams 93D that are connected at opposite ends to side rails 93A. Beams 93D have upper surfaces 93E and are positioned such that upper surfaces 93E are lower than upper surfaces 92D of trusses 92C. As a result, third section 93 is an open area with no obstructions located above beams 93D and between those portions of side rails 93A that extend along third section 93. In order to provide sufficient support and rigidity to third section 93 of chassis 90 without the use of trusses 92C, a plurality of vertically extending reinforcing members 94 are connected (as by welding) to the outer surface of side rails 93A in third section 93 of chassis 90. In the embodiment shown, reinforcing members 94 are I-beams. Reinforcing members 94 may be connected at one or both ends by a reinforcing member 95 to provide added rigidity. Additional stabilizing members 96 may be connected at opposite ends to side rails 93A for purposes of stabilizing third section 93 of chassis 90 during shipping. Stabilizing members 96 are removed during constructions of recreational vehicle 10.

Figure 11:
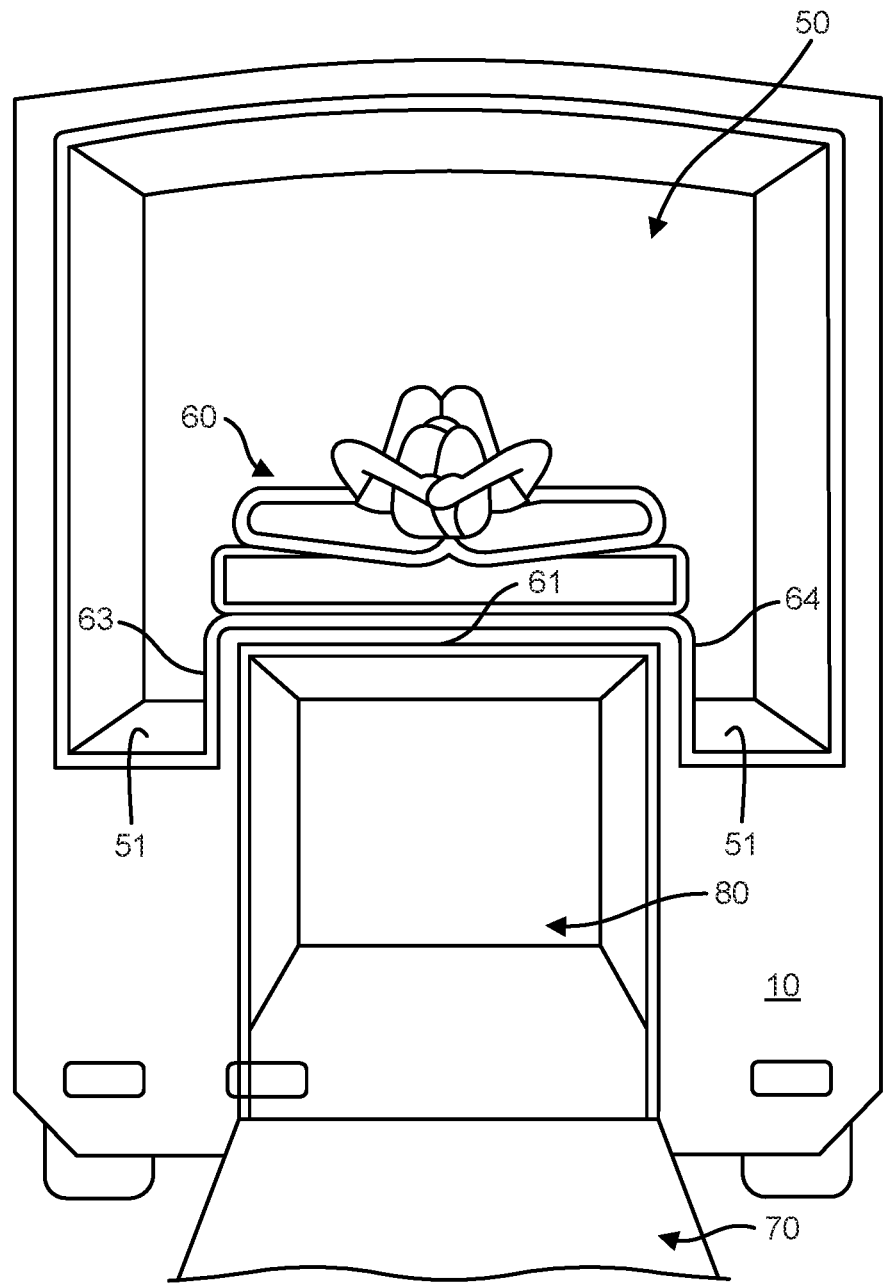
FIG. 11 is a rear schematic view of the garage and interior of the recreational vehicle shown in FIG. 1.

Beams 93D support floor 81 of garage 80. In this manner, floor 81 is lower than floor 41 of second living area 40. By lowering floor 81 of garage 80, floor 51 of third living area 50 can be lowered relative to the ceiling of third living area 50 so as to provide sufficient clearance for users to stand upright. Similarly, platform 61 of bed 60 can be raised without positioning it uncomfortably close to the ceiling of third living area 50 while at the same time providing sufficient clearance in garage 80 to accommodate snowmobiles, dirt bikes and other items typically transported in toy hauler recreational vehicles. This is shown schematically in FIG. 11.

Figure 12:
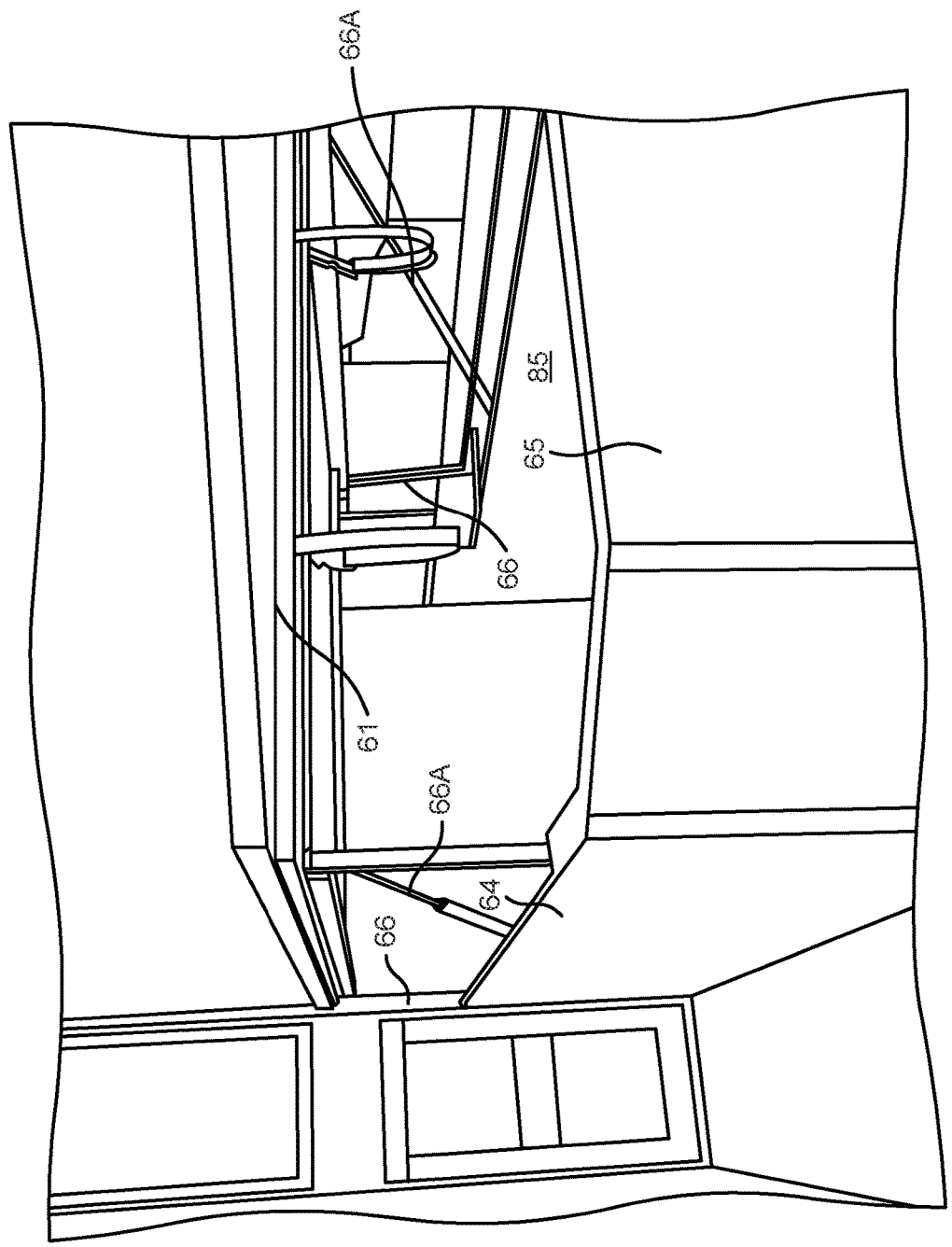
FIG. 12 is a perspective view of another embodiment of a bed that is a component of the recreational vehicle shown in FIG. 1.

Although the present invention has been shown and described in detail, the same is to be taken by way of illustration only and not by way of limitation. Numerous modifications can be made to the embodiments disclosed without departing from the scope of the invention. For example, bed 60 could include one or more assist devices, such as gas struts 66A, to assist in raising and lowering platform 61. This embodiment is shown in FIG. 12 with platform 61 in the raised position.

We claim:

1. A toy hauler recreational vehicle comprising:
   a front hitch end;
   a rear garage end;
   a front living area positioned near the front hitch end and having a first floor;
   a rear living area positioned near the rear garage end and having a second floor;
   a middle living area positioned between the front living area and the rear living area and having a third floor; and
   a garage having a garage floor that is located lower than the first floor, the second floor, and the third floor, the garage including an upper ceiling and a lower ceiling spaced from each other, wherein the upper ceiling is movable between a first lower height and a first upper height, wherein the lower ceiling is movable between a second lower height and a second upper height.

2. The toy hauler recreational vehicle of claim 1, wherein the rear living area includes a bed movable between a lowered position and a raised position.

3. The toy hauler recreational vehicle of claim 2, wherein the upper ceiling is at the first lower height and the lower ceiling is at the second lower height when the bed is in the lowered position, wherein the upper ceiling is at the first upper height and the lower ceiling is at the second upper height when the bed is in the raised position.

4. The toy hauler recreational vehicle of claim 2, wherein the bed includes a platform independently movable with respect to the second floor.

5. The toy hauler recreational vehicle of claim 4, wherein the platform supports a mattress of the bed.

6. The toy hauler recreational vehicle of claim 5, wherein a bottom surface of the platform defines, at least in part, the upper ceiling.

7. The toy hauler recreational vehicle of claim 1, further comprising:
   a fold-down ramp door for providing access to the garage.

8. The toy hauler recreational vehicle of claim 7, wherein the fold-down ramp door is the only access to the garage.

9. The toy hauler recreational vehicle of claim 1, further comprising:
an exterior back wall at or near the rear garage end.

10. The toy hauler recreational vehicle of claim 9, further comprising a ladder attached to the exterior back wall.

11. The toy hauler recreational vehicle of claim 1, further comprising:
a chassis having:
a pair of longitudinally extending side rails,
trusses extending between the side rails beneath the middle living area, and
beams extending between the side rails beneath the garage and the rear living area.

12. The toy hauler recreational vehicle of claim 11, wherein the beams support the garage floor.

13. The toy hauler recreational vehicle of claim 12, wherein there is no truss below the garage floor.

14. The toy hauler recreational vehicle of claim 12, wherein the trusses support the third floor.

15. The toy hauler recreational vehicle of claim 1, further comprising:
a first set of steps between the front living area and the middle living area; and
a second set of steps between the rear living area and the middle living area.

16. The toy hauler recreational vehicle of claim 1, wherein the garage is defined, at least in part, by the garage floor, a first side wall, an inner side wall, a front wall, an inner front wall, a second side wall, a ramp door, the upper ceiling, and the lower ceiling.

17. The toy hauler recreational vehicle of claim 16, wherein the inner side wall and the inner front wall form a partial boundary of a first space of the garage, wherein the first side wall, the front wall, and the second side wall form a partial boundary of a second space of the garage.

18. The toy hauler recreational vehicle of claim 17, wherein the second space is larger than the first space.

19. The toy hauler recreational vehicle of claim 18, wherein the front living area includes first and second opposing slideouts, wherein the opposing first and second slideouts include furniture.

20. The toy hauler recreational vehicle of claim 19, wherein the middle living area includes a third slideout that includes furniture, wherein the rear living area includes a fourth slideout, wherein the middle living area includes an island.

* * * * *